US009756350B2

(12) United States Patent
Chuang et al.

(10) Patent No.: US 9,756,350 B2
(45) Date of Patent: Sep. 5, 2017

(54) INTER-LAYER MOTION VECTOR SCALING FOR SCALABLE VIDEO CODING

(71) Applicant: HFI Innovation Inc., Zhubei, Hsinchu County (TW)

(72) Inventors: Tzu-Der Chuang, Zhubei (TW); Ching-Yeh Chen, Taipei (TW); Yu-Wen Huang, Taipei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 92 days.

(21) Appl. No.: 14/767,469

(22) PCT Filed: Mar. 12, 2014

(86) PCT No.: PCT/CN2014/073311
§ 371 (c)(1),
(2) Date: Aug. 12, 2015

(87) PCT Pub. No.: WO2014/139431
PCT Pub. Date: Sep. 18, 2014

(65) Prior Publication Data
US 2015/0381999 A1     Dec. 31, 2015

Related U.S. Application Data

(60) Provisional application No. 61/846,128, filed on Jul. 15, 2013, provisional application No. 61/814,591, (Continued)

(51) Int. Cl.
*H04N 19/33* (2014.01)
*H04N 19/503* (2014.01)
(Continued)

(52) U.S. Cl.
CPC ............. *H04N 19/33* (2014.11); *H04N 19/39* (2014.11); *H04N 19/503* (2014.11);
(Continued)

(58) Field of Classification Search
CPC .... H04N 19/503; H04N 19/513; H04N 19/53; H04N 19/33; H04N 19/39; H04N 19/61
(Continued)

(56) References Cited

U.S. PATENT DOCUMENTS

2006/0133482 A1  6/2006  Park et al.
2006/0209959 A1  9/2006  Sun
2008/0165855 A1  7/2008  Wang et al.

FOREIGN PATENT DOCUMENTS

CN     101198064     6/2008
CN     101873484     10/2010
CN     102740078     10/2012

OTHER PUBLICATIONS

CN101873484 Machine Translation.*
(Continued)

*Primary Examiner* — Nguyen Truong
(74) *Attorney, Agent, or Firm* — McClure, Qualey & Rodack, LLP

(57)  ABSTRACT

A method of inter-layer motion vector scaling using an inter-layer MV scaling factor to reduce computational complexity is disclosed. In one embodiment, image size information regarding the EL picture and the BL picture of the video sequence is received. An inter-layer motion vector (MV) scaling factor is determined based on the image size information. Scaled MVs are determined based on the BL MVs and the inter-layer MV scaling factor. The scaled MVs are then provided for inter-layer coding of the EL picture. In another embodiment, an inter-layer position-mapping scaling factor is determined based on the image size information regarding the EL picture and the BL picture. BL mapping positions corresponding to EL pixel positions are determined based on the EL pixel positions and the inter-layer position-mapping scaling factor. The up-sampled BL picture
(Continued)

at the BL mapping positions is then provided for inter-layer coding of the EL picture.

22 Claims, 5 Drawing Sheets

Related U.S. Application Data filed on Apr. 22, 2013, provisional application No. 61/803,222, filed on Mar. 19, 2013, provisional application No. 61/777,250, filed on Mar. 12, 2013.

(51) Int. Cl.
*H04N 19/513* (2014.01)
*H04N 19/61* (2014.01)
*H04N 19/39* (2014.01)
*H04N 19/53* (2014.01)

(52) U.S. Cl.
CPC .......... *H04N 19/513* (2014.11); *H04N 19/53* (2014.11); *H04N 19/61* (2014.11)

(58) Field of Classification Search
USPC .................................................. 375/240.16
See application file for complete search history.

(56) References Cited

OTHER PUBLICATIONS

International Search Report dated Jun. 30, 2014, issued in application No. PCT/CN2014/073311.
Francois, E., et al.; "Extended Spatial Scalability—A Generalization of Spatial Scalability for Non Dyadic configurations;" IEEE; 2006; pp. 169-172.
Sun, S., et al.; "Extended Spatial SVC with Picture-level Adaptation;" Joint Video Team (JVT) of ISO/IEC MPEG & ITU-T VCEG (ISO/IEC JTC1/SC29/WG11 and ITU-T SG16 Q.6); Apr. 2005; pp. 1-20.
Reichel, J., et al.; "Joint Scalable View Model (JSVM) 9;" International Organisation for Standardisation Coding of Moving Pictures and Audio; Jan. 2007; pp. 1-127.
Chuang, T.D., et al.; "Non-CE9-Division-free MV scaling;" Joint Collaborative Team on Video Coding (JCT-VC) of ITU-T SG16 WP3 and ISO/IEC JTC1/SC29/WG11; Nov. 2011 pp. 1-6.
Segall, C.A., et al.; "Spatial Scalability Within the H.264 AVC Scalable Video Coding Extension;" IEEE Transactions of Circuits and Systems for Video Technology; vol. 17; No. 9; Sep. 2007; pp. 1121-1135.
Schwarz, H., et al.; "Overview of the Scalable Video Coding Extension of the H.264/AVC Standard;" IEEE Transactions of Circuits and Systems for Video Technology; vol. 17; No. 9; Sep. 2007; pp. 1103-1120.

\* cited by examiner

INTER-LAYER MOTION VECTOR SCALING FOR SCALABLE VIDEO CODING

CROSS REFERENCE TO RELATED APPLICATIONS

The present invention is a National Phase Patent Application of pending PCT Application Ser. No. PCT/CN2014/073311, filed on Mar. 12, 2014, which claims priority to U.S. Provisional Patent Application, Ser. No. 61/777,250, filed Mar. 12, 2013, entitled "Methods of Motion Vector Scaling with Frame Cropping for Scalable Video Coding", U.S. Provisional Patent Application, Ser. No. 61/803,222, filed Mar. 19, 2013, entitled "Methods of Motion Vector Scaling and Pixel Position Mapping with Frame Cropping for Scalable Video Coding", U.S. Provisional Patent Application, Ser. No. 61/814,591, filed Apr. 22, 2013, entitled "Methods of simplified motion vector scaling and pixel position mapping for scalable video coding" and U.S. Provisional Patent Application, Ser. No. 61/846,128, filed Jul. 15, 2013, entitled "Methods of Inter-layer Motion Vector Scaling and Inter-layer Pixel Position Mapping with Phase Shift for Scalable Video Coding". The priority applications are hereby incorporated by reference in their entireties.

TECHNICAL FIELD

The present invention relates to scalable video coding. In particular, the present invention relates to inter-layer motion vector scaling and inter-layer pixel position mapping.

BACKGROUND

Compressed digital video has been widely used in various applications such as video streaming over digital networks and video transmission over digital channels. Very often, a single video content may be delivered over networks with different characteristics. For example, a live sport event may be carried in a high-bandwidth streaming format over broadband networks for premium video service. In such applications, the compressed video usually preserves high resolution and high quality so that the video content is suited for high-definition devices such as an HDTV or a high resolution LCD display. The same content may also be carried through cellular data network so that the content can be watch on a portable device such as a smart phone or a network-connected portable media device. In such applications, due to the network bandwidth concerns as well as the typical low-resolution display on the smart phone or portable devices, the video content usually is compressed into lower resolution and lower bitrates. Therefore, for different network environment and for different applications, the video resolution and video quality requirements are quite different. Even for the same type of network, users may experience different available bandwidths due to different network infrastructure and network traffic condition. Therefore, a user may desire to receive the video at higher quality when the available bandwidth is high and receive a lower-quality, but smooth, video when the network congestion occurs. In another scenario, a high-end media player can handle high-resolution and high bitrate compressed video while a low-cost media player is only capable of handling low-resolution and low bitrate compressed video due to limited computational resources. Accordingly, it is desirable to construct the compressed video in a scalable manner so that videos at different spatial-temporal resolution and/or quality can be derived from the same compressed bitstream.

The joint video team (JVT) of ISO/IEC MPEG and ITU-T VCEG standardized a Scalable Video Coding (SVC) extension of the H.264/AVC standard. An H.264/AVC SVC bitstream can contain video information from low frame-rate, low resolution, and low quality to high frame rate, high definition, and high quality. This single bitstream can be adapted to various applications and displayed on devices with different configurations. Accordingly, H.264/AVC SVC is suitable for various video applications such as video broadcasting, video streaming, and video surveillance to adapt to network infrastructure, traffic condition, user preference, and etc.

In SVC, three types of scalabilities, i.e., temporal scalability, spatial scalability, and quality scalability, are provided. SVC uses multi-layer coding structure to realize the three dimensions of scalability. A main goal of SVC is to generate one scalable bitstream that can be easily and rapidly adapted to the bit-rate requirement associated with various transmission channels, diverse display capabilities, and different computational resources without trans-coding or re-encoding. An important feature of the SVC design is that the scalability is provided at a bitstream level. In other words, bitstreams for deriving video with a reduced spatial and/or temporal resolution can be simply obtained by extracting Network Abstraction Layer (NAL) units (or network packets) from a scalable bitstream that are required for decoding the intended video. NAL units for quality refinement can be additionally truncated in order to reduce the bit-rate and the associated video quality. In SVC, temporal scalability is provided by using the hierarchical B-pictures coding structure. SNR scalability is realized by coding higher quality Enhancement Layers (ELs) which comprise refinement coefficients.

In SVC, spatial scalability is supported based on the pyramid coding scheme as shown in FIG. 1. In a SVC system with spatial scalability, the video sequence is first down-sampled to obtain smaller pictures at different spatial resolutions (layers). For example, picture 110 at the original resolution can be processed by spatial decimation 120 to obtain resolution-reduced picture 111. The resolution-reduced picture 111 can be further processed by spatial decimation 121 to obtain further resolution-reduced picture 112 as shown in FIG. 1. In addition to dyadic spatial resolution, where the spatial resolution is reduced to half in each level, SVC also supports arbitrary resolution ratios, which is called extended spatial scalability (ESS). The SVC system in FIG. 1 illustrates an example of spatial scalable system with three layers, where layer 0 corresponds to the pictures with lowest spatial resolution and layer 2 corresponds to the pictures with the highest resolution. The layer-0 pictures are coded without reference to other layers, i.e., single-layer coding. For example, the lowest layer picture 112 is coded using motion-compensated and Intra prediction 130.

The motion-compensated and Intra prediction 130 will generate syntax elements as well as coding related information such as motion information for further entropy coding 140. FIG. 1 actually illustrates a combined SVC system that provides spatial scalability as well as quality scalability (also called SNR (Signal to Noise Ratio) scalability). The system may also provide temporal scalability, which is not explicitly shown. For each single-layer coding, the residual coding errors can be refined using SNR enhancement layer coding 150. The SNR enhancement layer in FIG. 1 may provide multiple quality levels (quality scalability). Each supported resolution layer can be coded by respective single-layer motion-compensated and Intra prediction like a non-scalable coding system. Each higher spatial layer may also be coded using inter-layer coding based on one or more lower spatial layers. For example, layer 1 video can be adaptively coded using inter-layer prediction based on layer 0 video or a single-layer coding on a macroblock by macroblock basis or other block unit. Similarly, layer 2 video can be adaptively coded using inter-layer prediction based on reconstructed layer 1 video or a single-layer coding. As shown in FIG. 1, layer-1 pictures 111 can be coded by motion-compensated and Intra prediction 131, base layer entropy coding 141 and SNR enhancement layer coding 151. As shown in FIG. 1, the reconstructed base layer (BL) video data is also utilized by motion-compensated and Intra prediction 131, where a coding block in spatial layer 1 may use the reconstructed BL video data as an additional Intra prediction data (i.e., no motion compensation is involved). Similarly, layer-2 pictures 110 can be coded by motion-compensated and Intra prediction 132, base layer entropy coding 142 and SNR enhancement layer coding 152. The BL bitstreams and SNR enhancement layer bitstreams from all spatial layers are multiplexed by multiplexer 160 to generate a scalable bitstream. The coding efficiency can be improved due to inter-layer coding. Furthermore, the information required to code spatial layer 1 may depend on reconstructed layer 0 (inter-layer prediction). A higher layer in an SVC system is referred as an enhancement layer. The H.264 SVC provides three types of inter-layer prediction tools: inter-layer motion prediction, inter-layer texture prediction (or so-called inter-layer Intra prediction), and inter-layer residual prediction.

In SVC, the enhancement layer (EL) can reuse the motion information in the base layer (BL) to reduce the inter-layer motion data redundancy. For example, the EL macroblock coding may use a flag, such as base_mode_flag before mb_type is determined to indicate whether the EL motion information is directly derived from the BL. If base_mode_flag is equal to 1, the partitioning data of the EL macroblock along with the associated reference indexes and motion vectors are derived from the corresponding data of the collocated 8×8 block in the BL. The reference picture index of the BL is directly used in the EL. The motion vectors of the EL are scaled from the data associated with the BL. Besides, the scaled BL motion vector can be used as an additional motion vector predictor for the EL.

Inter-layer residual prediction uses the up-sampled BL residual information to reduce the information required for coding the EL residuals. The collocated residual of the BL can be block-wise up-sampled using a bilinear filter and can be used as prediction for the residual of a corresponding macroblock in the EL. The up-sampling of the reference layer residual is done on transform block basis in order to ensure that no filtering is applied across transform block boundaries.

The inter-layer texture prediction reduces the redundant texture information of EL. The prediction in the EL is generated by block-wise up-sampling the collocated BL reconstruction signal. In the inter-layer texture prediction up-sampling procedure, 4-tap and 2-tap FIR filters are applied for luma and chroma components, respectively. Different from inter-layer residual prediction, filtering for the inter-layer Intra prediction is always performed across sub-block boundaries. For decoding simplicity, inter-layer Intra prediction can be applied only to the intra-coded macroblocks in the BL.

In SVC, the motion information of a block in the EL may use the motion information within the corresponding block in the BL. For example, the motion information associated with locations a-h in the collocated block in the BL as shown in FIG. 2 can be used to derive inter-layer prediction. In FIG. 2, block 210 corresponds to a current block in the EL and block 220 is the corresponding block in the BL. the motion information at a, b, g, and h in the BL are the corresponding motion information of A, B, G, and H in the EL. The c, d, e, f are the corresponding motion information of C, D, E, and F in the EL. Locations A, B, G, and H are the four corner pixels of the current block in the EL and locations C, D, E, and F are the four center pixels of the current block in the EL.

Not only the motion information of the corresponding block in the BL, but also the motion information of neighboring blocks of the corresponding block in the BL can be utilized as inter-layer candidates for the EL to include in the Merge/AMVP candidate list. As shown in FIG. 2, the neighboring candidates in the BL, including t (bottom-right), a0 (bottom-left), a1 (left), b0 (upper-right), b1 (top), and b2 (upper-left) neighboring BL blocks, can be used as a candidate for the EL to include in the Merge/AMVP candidate derivation. The collocated EL neighboring blocks correspond to T (bottom-right), A0 (bottom-left), A1 (left), B0 (upper-right), B1 (top), and B2 (upper-left) neighboring EL blocks respectively.

High-Efficiency Video Coding (HEVC) is a new international video coding standard being developed by the Joint Collaborative Team on Video Coding (JCT-VC). The scalable extension to the HEVC (i.e., SHVC) is also being developing. In HEVC, motion information of neighboring blocks in the spatial and temporal domains is used to derive the Merge and MVP (motion vector prediction) candidates. The motion information includes Inter prediction direction (inter_pred_idc), reference indexes (refIdx), motion vectors (MVs), motion vector predictors (MVPs), MVP indexes, Merge indexes, Merge candidates, etc. In the derivation process for the spatial MVPs, the MVP can be derived from the MV pointing to the same reference picture as the target reference picture, or from the MV pointing to different reference pictures. When the MVP is derived from a MV pointing to a different reference picture, the MV is scaled to the target reference picture and used as the final MVP. In the derivation process for the spatial and temporal MVPs, the division is required to scale the motion vector. The scaling factor is calculated based on the ratio of the distance between current picture and the target reference picture and the distance between the collocated picture and the reference picture for the collocated block. In the MV scaling process, the scaling factor is defined by equation (1):

$$\text{ScalingFactor} = (\text{POCcurr} - \text{POCref})/(\text{POCcol} - \text{POCcol\_ref}) = tb/td, \quad (1)$$

where td is the POC (picture order count) distance between the collocated picture and the reference picture pointed to by the MV of the collocated block, and tb is the POC distance between the current picture and the target reference picture. The scaling factor for spatial MVP derivation is derived similarly. In HEVC, the scaling factor is calculated as follows:

$$X = (2^{14} + |td/2|)/td, \text{ and} \quad (2)$$

$$\text{ScalingFactor} = \text{clip}(-4096, 4095, (tb \times X + 32) \gg 6). \quad (3)$$

The scaled MV is then derived as follows:

$$\text{ScaledMV} = \text{sign}(\text{ScalingFactor} \times \text{MV}) \times ((\text{abs}(\text{ScalingFactor} \times \text{MV}) + 127)) \gg 8 \quad (4)$$

In SHVC Test Model 1.0 (SHM-1.0), the inter-layer texture prediction can be implemented in two schemes. The first scheme uses CU-level signaling to indicate whether the predictor of this CU is from the up-sampled BL texture or not, where Intra_BL mode is used for signaling the selection. The second scheme incorporates the up-sampled BL texture into reference frame list. In other words, the reference picture associated with the up-sampled BL texture is assigned a reference picture index, i.e., RefIdx. This scheme is referred to as RefIdx mode. Motion information associated with a reference picture is also stored and used for Inter prediction. Accordingly, for the up-scaled BL reference, the associated MVs have to be up-scaled as well. RefIdx mode has least impact on the existing HEVC syntax.

In SHM-1.0 Intra_BL mode, the center MV of the corresponding block in the BL (i.e., the MV at position "f" in FIG. 2) is scaled and set to the first Merge candidate in the EL Merge candidate list as an inter-layer Merge candidate. The MV scaling process for inter-layer Merge candidate is different from the MV scaling process in HEVC. In SHM-1.0, the base layer (BL) MV is scaled based on the ratio of video resolution between enhancement layer (EL) and BL. The scaled MV is derived as follows:

$$mvEL\_X=(mvBL\_X \times picEL\_W+(picBL\_W/2-1) \times sign(mvBL\_X))/picBL\_W, \text{ and} \quad (5)$$

$$mvEL\_Y=(mvBL\_Y \times picEL\_H+(picBL\_H/2-1) \times sign(mvBL\_Y))/picBL\_H, \quad (6)$$

where (mvEL_X, mvEL_Y) is the scaled MV in the EL, (mvBL_X, mvBL_Y) is the center MV of the corresponding block in the BL, picEL_W and picEL_H are the picture width and height of the EL picture, and picBL_W and picBL_H are the picture width and height of the BL picture.

In SHM-1.0, for a pixel in the EL with the pixel position equal to (xEL, yEL), the pixel position mapping used to derive the reference pixel in the BL of the corresponding EL pixel can be illustrated as follows:

$$xBL=(xEL \times picBL\_W+picEL\_W/2)/picEL\_W, \text{ and} \quad (7)$$

$$yBL=(yEL \times picBL\_H+picEL\_H/2)/picEL\_H, \quad (8)$$

where (xBL, yBL) is the pixel position of the reference pixel in the BL, picEL_W and picEL_H are the picture width and height of the EL picture, and picBL_W and picBL_H are the picture width and height of the BL picture.

In SHM-1.0 texture up-sampling, the BL pixel position of the reference pixel in the BL is outputted in unit of 1/16-th sample. The derivation of the BL pixel position in unit of 1/16-th sample is illustrated as follows.

The variable xBL16 is derived as follows:

$$xBL16=(xEL \times picBL\_W \times 16+picEL\_W/2)/picEL\_W.$$

The variable yBL16 is derived as follows:

If cIdx is equal to 0, the variable yBL16 is derived as follows:

$$yBL16=(yEL \times picBL\_H \times 16+picEL\_H/2)/picEL\_H,$$

otherwise, the variable yBL16 is derived as follows:

$$yBL16=(yEL \times picBL\_H \times 16+picEL\_H/2)/picEL\_H-\text{offset},$$

where the cIdx is the color component index, and offset is derived as follows:

if (picEL_H==picBL_H)
  offset=0;
otherwise if (picEL_H==1.5*picBL_H)
  offset=1; and
otherwise if (picEL_H==2.0*picBL_H)
  offset=2.

In the RefIdx mode as supported by SHVC Test Model 1.0 (SHM-1.0), the decoded BL picture is up-sampled and incorporated into the long-term reference pictures list as the inter-layer reference picture. For this inter-layer reference picture, not only the texture is up-sampled from BL picture, but also the motion field is up-sampled and mapped from BL picture according to the spatial ratio of EL and BL. FIG. 3 shows an example of the motion field mapping with 1.5× spatial scalability. In this example, four smallest PUs (SPUs) in the BL (i.e., b0-b3) are mapped into nine SPUs in the EL (i.e., e0-e8). The motion fields of the nine PUs in the EL can be derived from the motion fields of the BL.

To reduce the size of the motion data buffer, the motion field in the EL is compressed with the unit size of 16×16 block after the motion mapping. In SHM-1.0, the center motion vector (as indicated by C) of a 16×16 block is used to represent the motion vector of this 16×16 block after compression, as shown in FIG. 4.

As shown in equations (5) and (6), the motion vector scaling involves quite a few operations for each motion vector. Among them, the division operation is most time consuming or most complicated. The situation is the same for inter-layer pixel position mapping as shown in equations (7) and (8). Therefore, it is desirable to develop methods to simplify motion vector scaling and pixel position mapping for inter-layer coding.

SUMMARY

A method of inter-layer motion vector scaling for scalable video coding is disclosed where the motion vector scaling uses an inter-layer MV scaling factor to reduce computational complexity. The video sequence data is configured into a Base Layer (BL) and an Enhancement Layer (EL) and wherein the EL picture has higher spatial resolution than the BL picture. Embodiments according to the present invention receive image size information regarding the EL picture and the BL picture of the video sequence, and determine an inter-layer motion vector (MV) scaling factor based on the image size information regarding the EL picture and the BL picture. BL motion vectors (MVs) associated with the BL picture are received. Scaled MVs are determined based on the BL MVs and the inter-layer MV scaling factor, and are provided for inter-layer predictive coding of the EL picture.

In one embodiment, the inter-layer MV scaling factor is related to cropped EL picture resolution of the EL picture and cropped BL picture resolution of the BL picture. The inter-layer MV scaling factor can be determined from a ratio of biased-pre-scaled cropped EL picture resolution to the cropped BL picture resolution, wherein the biased-pre-scaled cropped EL picture resolution is obtained by adding a bias value to pre-scaled cropped EL picture resolution, and wherein the pre-scaled cropped EL picture resolution is derived by applying arithmetic left shift by K bits to the cropped EL picture resolution and K is a non-negative integer. The ratio can be further clipped to a range having a floor value and a ceiling value.

In another embodiment, individual inter-layer MV scaling factors are determined for horizontal direction and vertical direction. The individual inter-layer MV scaling factors for the horizontal direction and the vertical direction can be signaled in a sequence level, a picture level or a slice level. The individual inter-layer MV scaling factors for the horizontal direction and the vertical direction are signaled in sequence parameter set (SPS), picture parameter set (PPS), slice header, SPS extension, PPS extension, or slice segment header extension. A flag can be used to indicate whether the individual inter-layer MV scaling factors are equal or not.

In yet another embodiment, the inter-layer MV scaling factor is determined once for an EL image unit and all blocks in the EL image unit share the inter-layer MV scaling factor, wherein the image unit corresponds to one video sequence, one picture, one slice, one coding tree unit (CTU), one coding tree block (CTB), one coding unit (CU) or one prediction unit (PU). In yet another embodiment, an inter-layer position-mapping scaling factor is determined based on the inter-layer MV scaling factor, wherein the inter-layer position-mapping scaling factor is used to determine BL mapping positions corresponding to EL pixel positions, and wherein the BL mapping positions are determined based on the EL pixel positions and the inter-layer position-mapping scaling factor.

A method of inter-layer position-mapping for scalable video coding is disclosed where pixel position mapping uses an inter-layer position-mapping scaling factor to reduce computational complexity. Embodiments according to the present invention receive image size information regarding the EL picture and the BL picture of the video sequence, and determine the inter-layer position-mapping scaling factor based on the image size information regarding the EL picture and the BL picture. BL mapping positions corresponding to EL pixel positions are determined based on the EL pixel positions and the inter-layer position-mapping scaling factor, and are provided for inter-layer predictive coding of the EL picture.

In one embodiment, the inter-layer position-mapping scaling factor is related to cropped BL picture resolution of the BL picture and cropped EL picture resolution of the EL picture. The inter-layer position-mapping scaling factor can be determined from a ratio of biased-pre-scaled cropped BL picture resolution to the cropped EL picture resolution, wherein the biased-pre-scaled cropped BL picture resolution is obtained by adding a bias value to pre-scaled cropped BL picture resolution, and wherein the pre-scaled cropped BL picture resolution is derived by applying arithmetic left shift by N bits to the cropped BL picture resolution and N is a non-negative integer.

The BL mapping position for a given EL pixel position can be determined by adding a first offset term to a first product, wherein the first offset term corresponds to BL picture cropping starting position, the first product is obtained by multiplying the inter-layer position-mapping scaling factor by a first distance from the given EL pixel position to the EL picture cropping starting position. The first product can be further processed by adding a bias value to obtain a biased first product and applying arithmetic right shift by N bits to the biased first product, and N is a non-negative integer. The BL mapping position for the given EL pixel position can be determined by adding a second offset term to the first offset term and the first product, wherein the second offset term corresponds to a phase shift related to up-sampling and down-sampling applied to the EL picture and the BL picture. The EL pixel position and the BL pixel positions can be clipped to a range.

In another embodiment, an inter-layer motion vector (MV) scaling factor is determined based on the inter-layer position-mapping scaling factor, wherein the inter-layer MV scaling factor is used to determine scaled MVs based on the BL MVs and the inter-layer MV scaling factor.

DETAILED DESCRIPTION

Figure 1:
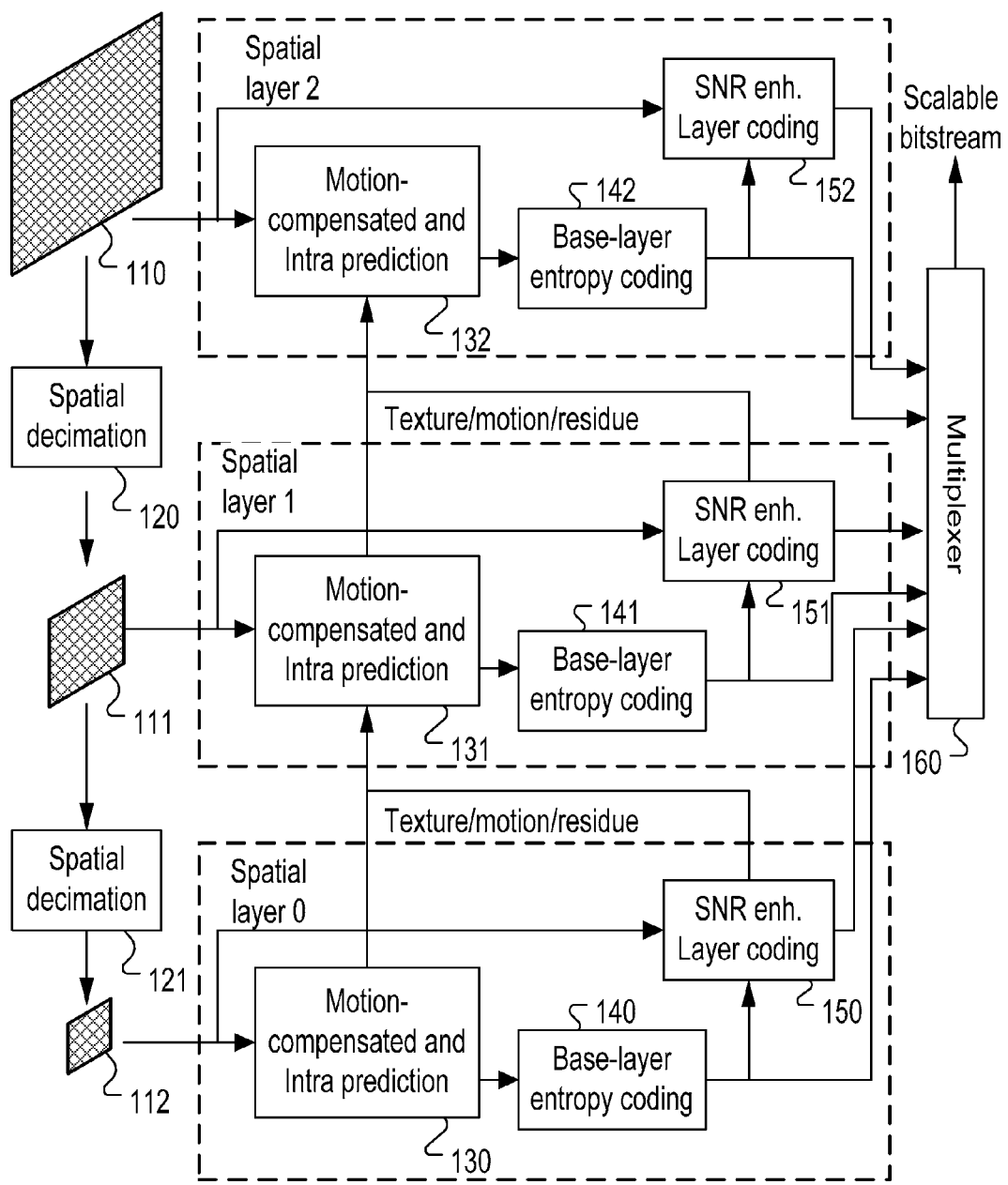
FIG. 1 illustrates an example of prediction structure for a scalable video coding system consisting of three layers.

As mentioned earlier, in scalable video coding based on AVC/H.264 (SVC) or based on HEVC (SHVC), the processing involves moderate amount of computation for motion vector scaling and inter-layer pixel position mapping. The present invention discloses various embodiments to reduce the required computational complexity.

Inter-Layer MV Scaling

As shown in equations (5) and (6), the division has to be performed for every inter-layer MV even when the picture resolution ratio of the EL to the BL is a fixed value. In addition, equations (5) and (6) do not take into consideration of the frame cropping issue. Embodiments of the present invention disclose inter-layer motion information derivation for SHVC to reduce the required computation complexity.

In one embodiment, two inter-layer motion vector (MV) scaling factors are derived for inter-layer MV scaling first. The MV scaling process in HEVC as shown the equation (4) is re-used. One scaling factor is used for the horizontal direction (MV_x), and the other is used for the vertical direction (MV_y). For the inter-layer MV scaling factor, the cropping factors are also considered. The inter-layer MV scaling factor in the x direction is derived according to an embodiment of the present invention as follows:

$$\text{ILScalingFactor\_}x = (((\text{picELCropWidth}) << K1) + \text{offset1\_}x)/(\text{picBLCropWidth}), \quad (9)$$

where picELCropWidth=picEL_W−picELCropLeftOffset−picELCropRightOffset and picBLCropWidth=picBL_W−picBLCropLeftOffset−picBLCropRightOffset. The EL picture is cropped on the left side by picELCropLeftOffset pixels and on the right side by picELCropRightOffset pixels. The BL picture is cropped on the left side by picBLCropLeftOffset pixels and on the right side by picBLCropRightOffset pixels. offset1_x can be 0 or can be derived as (picBLCropWidth)>>1 or ((picBLCropWidth)>>1)−1. K1 is an integer and K1 can be 8 as an example.

As shown in equation (9), scaling factor, ILScalingFactor_x is related to the ratio of cropped EL picture width (i.e. picELCropWidth) to cropped BL picture width (i.e., picBLCropWidth), and ILScalingFactor_x is represented as an integer. However, picELCropWidth is pre-scaled by applying arithmetic left shift by K1 bits. Furthermore, a bias value (i.e., offset1_x) is added to the pre-scaled picELCropWidth. The bias-added, pre-scaled picELCropWidth is then divided by picBLCropWidth to obtain ILScalingFactor_x.

The inter-layer MV scaling factor in the y direction is derived according to an embodiment of the present invention as follows:

$$\text{ILScalingFactor}\_y=(((\text{picELCropHeight})<<K1)+\text{offset1}\_y)/(\text{picBLCropHeight}), \quad (10)$$

where picELCropHeight=picEL_H−picELCropTopOffset−picELCropBottomOffset and picBLCropHeight=picBL_H−picBLCropTopOffset−picBLCropBottomOffset. The EL picture is cropped on the top side by picELCropTopOffset pixels and on the bottom side by picELCropBottomOffset pixels. The BL picture is cropped on the top side by picBLCropTopOffset pixels and on the bottom side by picBLCropBottomOffset pixels. offset1_y can be 0 or can be derived as (picBLCropHeight)>>1 or ((picBLCropHeight)>>1)−1.

As shown in equation (10), scaling factor, ILScalingFactor_y is related to the ratio of cropped EL picture height (i.e. picELCropHeight) to cropped BL picture height (i.e., picBLCropHeight), and ILScalingFactor_y is represented as an integer. However, picELCropHeight is pre-scaled by applying arithmetic left shift by K1 bits. Furthermore, a bias value (i.e., offset1_y) is added to the pre-scaled picEL-CropHeight. The bias-added, pre-scaled picELCropHeight is then divided by picBLCropHeight to obtain ILScalingFactor_y.

For convenience, picELCropLeftOffset and picELCropTopOffset are referred as EL picture first edge in this disclosure. Similarly, picBLCropLeftOffset and picBLCropTopOffset are referred as BL picture first edge in this disclosure.

While the same parameter, K1 is used for ILScalingFactor_x and ILScalingFactor_y derivation as shown in equations (9) and (10), two different parameters may also be used. If the EL picture is not cropped horizontally, both picELCropLeftOffset and picELCropRightOffset will be 0. If the BL picture is not cropped horizontally, both picBLCropLeftOffset and picBLCropRightOffset will be 0. If the EL picture is not cropped vertically, both picELCropTopOffset and picELCropBottomOffset will be 0. If the BL picture is not cropped vertically, both picBLCropTopOffset and picBLCropBottomOffset will be 0.

The inter-layer MV scaling factors can be further clipped within a certain range. The inter-layer MV scaling factor derivation with clipping according to an embodiment of the present invention is shown as follows:

$$\text{ILScalingFactor}\_x=\text{clip}(\text{clip\_floor1}\_x, \text{clip\_ceiling1}\_x,(((\text{picELCropWidth})<<K1)+\text{offset1}\_x)/(\text{picBLCropWidth})), \text{ and} \quad (11)$$

$$\text{ILScalingFactor}\_y=\text{clip}(\text{clip\_floor1}\_y, \text{clip\_ceiling1}\_y,(((\text{picELCropHeight})<<K1)+\text{offset1}\_y)/(\text{picBLCropHeight})) \quad (12)$$

where clip_floor1_x, clip_ceiling1_x, clip_floor1_y and clip_ceiling1_y are integers. For example, clip_floor1_x and clip_floor1_y can be −(2^O1) or 0, clip_ceiling1_x and clip_ceiling1_y can be (2^P1−1), where O1 and P1 are integers. For example, O1 and P1 can be 14. In equations (11) and (12), while clip_floor1_x and clip_floor1_y use the same value, they may also have different floor values. Similarly, while clip_ceiling1_x and clip_ceiling1_y use the same value, they may also have different floor values. clip (x,y,z) is a clipping function defined as:

$$\text{clip}(x, y, z) = \begin{cases} x & ; z < x \\ y & ; z > y \\ z & ; \text{otherwise} \end{cases}$$

In the above derivations, parameters picELCropLeftOffset, picELCropRightOffset, picELCropTopOffset and picELCropBottomOffset specify the samples of the cropped EL pictures in the coded video sequence. The samples of the EL pictures are generated from the decoding process and the samples of the cropped EL pictures are specified in a rectangular region by the four offset quantities around the cropped EL picture. On the other hand, parameters picBLCropLeftOffset, picBLCropRightOffset, picBLCropTopOffset and picBLCropBottomOffset specify the samples of the cropped BL pictures in the coded video sequence. The samples of the cropped BL pictures are generated from the decoding process and the samples of the BL pictures are specified in a rectangular region by the offset quantities around the cropped BL picture.

The final step of inter-layer scaled MV can reuse the MV scaling process of HEVC which can be derived as follows:
Inter-layer MV scaling method-1:

$$\text{mvEL}\_X=\text{sign}(\text{ILScalingFactor}\_x\times\text{mvBL}\_X)\times((\text{abs}(\text{ILScalingFactor}\_x\times\text{mvBL}\_X)+\text{add2}\_x)>>K2, \text{and} \quad (13)$$

$$\text{mvEL}\_Y=\text{sign}(\text{ILScalingFactor}\_y\times\text{mvBL}\_Y)\times((\text{abs}(\text{ILScalingFactor}\_y\times\text{mvBL}\_Y)+\text{add2}\_y))>>K2, \quad (14)$$

The scaled MV can be further clipped within a certain range. The derivation with clipping are as follows:
Inter-layer MV scaling method-2 with clip:

$$\text{mvEL}\_X=\text{clip}(\text{clip\_floor2}\_x,\text{clip\_ceiling2}\_x,\text{sign}(\text{ILScalingFactor}\_x\times\text{mvBL}\_X)\times((\text{abs}(\text{ILScalingFactor}\_x\times\text{mvBL}\_X)+\text{add2}\_x))>>K2), \text{and} \quad (15)$$

$$\text{mvEL}\_Y=\text{clip}(\text{clip\_floor2}\_y,\text{clip\_ceiling2}\_y,\text{sign}(\text{ILScalingFactor}\_y\times\text{mvBL}\_Y)\times((\text{abs}(\text{ILScalingFactor}\_y\times\text{mvBL}\_Y)+\text{add2}\_y))>>K2), \quad (16)$$

where add2_x and add2_y can be 0, 2^(K2−1) or (2^(K2−1)−1), clip_floor2_x and clip_floor2_y can be −(2^O2), clip_ceiling2_x and clip_ceiling2_y can be (2^P2−1), where K2, O2 and P2 can be any integer value. For example, K2 can be 8, O2 and P2 can be 15.

The inter-layer MV scaling method-1 as described above can be simplified. The sign part can be determined from mvBL_X and mvBL_Y respectively. Accordingly, the inter-layer scaled MV derivation can be simplified as:

$$\text{mvEL}\_X=\text{sign}(\text{mvBL}\_X)\times((\text{abs}(\text{ILScalingFactor}\_x\times\text{mvBL}\_X)+\text{add2}\_x)>>K2, \text{ and} \quad (17)$$

$$\text{mvEL}\_Y=\text{sign}(\text{mvBL}\_Y)\times((\text{abs}(\text{ILScalingFactor}\_y\times\text{mvBL}\_Y)+\text{add2}\_y))>>K2, \quad (18)$$

A clipped version of the simplified derivation corresponding to equations (17) and (18) is shown as follows:

$$\text{mvEL}\_X=\text{clip}(\text{clip\_floor2}\_x,\text{clip\_ceiling2}\_x,\text{sign}(\text{mvBL}\_X)\times((\text{abs}(\text{ILScalingFactor}\_x\times\text{mvBL}\_X)+\text{add2}\_x))>>K2), \text{ and} \quad (19)$$

$$\text{mvEL}\_Y=\text{clip}(\text{clip\_floor2}\_y,\text{clip\_ceiling2}\_y,\text{sign}(\text{mvBL}\_Y)\times((\text{abs}(\text{ILScalingFactor}\_y\times\text{mvBL}\_Y)+\text{add2}\_y))>>K2), \quad (20)$$

Furthermore, for one EL, ILScalingFactor_x and ILScalingFactor_y will be the same for all coding blocks. Therefore, the computation of ILScalingFactor_x and ILScalingFactor_y can be executed once and the results can be reused for all coding blocks in the EL. Accordingly, embodiments as disclosed above can reduce computation complexity of MV scaling in the EL when the MVs in BL are scaled.

In one embodiment, the ILScalingFactor_x and ILScalingFactor_y can be signaled in sequence/picture/slice-level. For example, the ILScalingFactor_x and ILScalingFactor_y can be signaled in SPS (sequence parameter set), PPS (picture parameter set), slice header, SPS extension, PPS extension or slice segment header extension. One flag can be sent to indicate whether ILScalingFactor_x and ILScalingFactor_y are the same. If ILScalingFactor_x is equal to ILScalingFactor_y, only one of them needs to be signaled.

Inter-Layer Pixel Position Mapping Method

As shown in equations (7) and (8), the division has to be performed for every inter-layer pixel position mapping even when the picture resolution ratio of the EL to the BL is a fixed value. In addition, equations (7) and (8) do not take into consideration of the frame cropping issue. Embodiments of the present invention disclose inter-layer BL pixel position mapping for SHVC to reduce the required computation complexity.

Similar to inter-layer MV scaling, two inter-layer position mapping scaling factors are derived first for inter-layer pixel position mapping. The scaling factors are then reused to derive the reference pixel position in the BL. One scaling factor is used for the horizontal position (x-direction), and the other is used for the vertical position (y-direction). For the inter-layer position mapping scaling factors, the cropping factors are also considered. The inter-layer position mapping scaling factor in the x direction is derived according to an embodiment of the present invention as follows:

$$ILPosScalingFactor\_x=(((picBLCropWidth<<N1)+ offset\_x)/(picELCropWidth), \quad (21)$$

where picELCropWidth=picEL_W−picELCropLeftOffset−picELCropRightOffset and picBLCropWidth=picBL_W−picBLCropLeftOffset−picBLCropRightOffset. offset_x can be 0 or derived as (picELCropWidth)>>1 or ((picELCropWidth)>>1)−1. N1 is an integer. For example, N1 can be 8, 10, 12, 14 or 16. As shown in equation (21), scaling factor, ILPosScalingFactor_x is related to the ratio of cropped BL picture width (i.e. picBLCropWidth) to cropped EL picture width (i.e., picELCropWidth), and ILPosScalingFactor_x is represented as an integer. However, picBLCropWidth is pre-scaled by applying arithmetic left shift by N1 bits. Furthermore, a bias value (i.e., offset_x) is added to the pre-scaled picBLCropWidth. The bias-added, pre-scaled picBLCropWidth is then divided by picELCropWidth to obtain ILPosScalingFactor_x.

Similarly, the inter-layer position mapping scaling factor in the y direction is derived according to an embodiment of the present invention as follows:

$$ILPosScalingFactor\_y=(((picBLCropHeight<<N1)+ offset\_y)/(picELCropHeight) \quad (22)$$

where picELCropHeight=picEL_H−picELCropTopOffset−picELCropBottomOffset and picBLCropHeight=picBL_H−picBLCropTopOffset−picBLCropBottomOffset. offset_y can be 0 or derived as (picELCropHeight)>>1 or ((picELCropHeight)>>1)−1. As shown in equation (22), scaling factor, ILPosScalingFactor_y is related to the ratio of cropped BL picture height (i.e. picBLCropHeight) to cropped EL picture width (i.e., picELCropHeight), and ILPosScalingFactor_y is represented as an integer. However, picBLCropHeight is pre-scaled by applying arithmetic left shift by N1 bits. Furthermore, a bias value (i.e., offset_y) is added to the pre-scaled picBLCropHeight. The bias-added, pre-scaled picBLCropHeight is then divided by picELCropHeight to obtain ILPosScalingFactor_y. While the same parameter, N1 is used for both ILPosScalingFactor_x and ILPosScalingFactor_y derivation, different parameters may also be used.

In the above derivation, parameters picELCropLeftOffset, picELCropRightOffset, picELCropTopOffset and picELCropBottomOffset specify the samples of the cropped EL pictures in the coded video sequence. The samples of the cropped EL pictures are generated from the decoding process and the samples of the EL picture are specified in a rectangular region by the four offset quantities around the cropped EL picture. On the other hand, parameters picBLCropLeftOffset, picBLCropRightOffset, picBLCropTopOffset and picBLCropBottomOffset specify the samples of the cropped BL pictures in the coded video sequence. The samples of the BL pictures are generated from the decoding process and the samples of the BL pictures are specified in a rectangular region by the four offset quantities around the cropped BL picture. As mentioned before, if the EL picture is not cropped, picELCropLeftOffset, picELCropRightOffset, picELCropTopOffset and picELCropBottomOffset will be 0. If the BL picture is not cropped, picBLCropLeftOffset, picBLCropRightOffset, picBLCropTopOffset and picBLCropBottomOffset will be 0.

For a pixel in the EL with the pixel position equal to (xEL, yEL), the reference pixel position in the BL can be derived according to an embodiment of the present invention as follows:

$$xBL=(((xEL-picELCropLeftOffset)\times ILPosScalingFactor\_x+add3\_x)>>N1)+picBLCropLeftOffset,$$
and (23)

$$yBL=(((yEL-picELCropTopOffset)\times ILPosScalingFactor\_y+add3\_y)>>N1)+picBLCropTopOffset, \quad (24)$$

where (xBL, yBL) is the pixel position of the reference pixel in the BL, add3_x and add3_y are equal to 0, (2^(N1−1)) or (2^(N1−1))−1. As shown in equation (23), the term (xEL−picELCropLeftOffset) corresponds to the horizontal distance between the current EL pixel position (i.e., EL) and the EL picture first edge in the x direction. The horizontal distance is then multiplied by ILPosScalingFactor_x to obtain a first product term. A bias (i.e., add3_x) is added to the first product. The result is then pre-scaled by applying arithmetic right shifted by N1 bits. The BL mapping position in the x direction is determined by adding picBLCropLeftOffset to the pre-scaled result. The BL mapping position in the y direction is determined similarly as shown in equation (24).

Since the phase of the EL and the BL might not be aligned. For example, the up-sampling and down-sampling filters use different phases. Since the BL picture is derived from an original high resolution picture by using down-sampling. For inter-layer prediction, a BL picture has to be up-sampled to match the resolution of an EL picture. If the down-sampling filtering and up-sampling filter is not properly done, phase shift may occur in the up-sampled or down-sampled data. In order to compensate the phase shift, for a pixel in the EL with the pixel position equal to (xEL, yEL), the reference pixel position in the BL can be derived according to an embodiment of the present invention as follows:

$$xBL=(((xEL-picELCropLeftOffset)\times ILPosScalingFactor\_x+add3\_x)>>N1)+picBLCropLeftOffset-$$
horizontal_phase_offset, and (25)

$$yBL=(((yEL-picELCropTopOffset)\times ILPosScalingFactor\_y+add3\_y)>>N1)+picBLCropTopOffset-$$
vertical_phase_offset, (26)

where horizontal_phase_offset and vertical_phase_offset are the phase shift between the BL and the EL. In the case that the phase of the EL and the BL are aligned, horizontal_phase_offset and vertical_phase_offset will be 0.

In Inter-layer pixel position mapping, the (xEL, yEL) and the (xBL, yBL) can be clipped into a valid range before or after pixel mapping. For example, the (xEL, yEL) and the (xBL, yBL) can be clipped to be within a picture frame.

In one example, the (xEL, yEL) can be clipped before inter-layer pixel position mapping. The following clipping function can be applied before equation (23) and (24):

$$xEL = \text{clip}(0, picEL\_W, xEL), \text{ and}$$

$$yEL = \text{clip}(0, picEL\_H, yEL). \tag{27}$$

Alternatively, the clipping can also be done according to:

$$xEL = \text{clip}(0 + picELCropLeftOffset, picEL\_W - picELCropRightOffset, xEL), \text{ and}$$

$$yEL = \text{clip}(0 + picELCropTopOffset, picEL\_H - picELCropBottomOffset, yEL). \tag{28}$$

The clipping function for the (xBL, yBL) can be added after inter-layer pixel position mapping (i.e., after the equation (23) to (24)):

$$xBL = \text{clip}(0, picBL\_W, xBL)$$

$$yBL = \text{clip}(0, picBL\_H, yBL) \tag{29}$$

Alternatively, the clipping can also be done according to:

$$xBL = \text{clip}(0 + picBLCropLeftOffset, picBL\_W - picBLCropRightOffset, xBL)$$

$$yBL = \text{clip}(0 + picBLCropTopOffset, picBL\_H - picBLCropBottomOffset, yBL) \tag{30}$$

Furthermore, for each EL, ILPosScalingFactor_x and ILPosScalingFactor_y will be the same for all pixels. Therefore the computation of ILPosScalingFactor_x and ILPosScalingFactor_y can be performed once and the results can be reused for all pixels in the EL. Accordingly, embodiments of the present invention can substantially reduce the computation complexity for inter-layer pixel position mapping.

The ILPosScalingFactor_x and ILPosScalingFactor_y can be signaled in sequence, picture or slice-level. For example, the ILPosScalingFactor_x and ILPosScalingFactor_y can be signaled in SPS, PPS, or slice header. One flag can be sent to indicate whether ILPosScalingFactor_x and ILPosScalingFactor_y are the same. If ILPosScalingFactor_x is equal to ILPosScalingFactor_y, only one of them needs to be signaled.

Furthermore, the ILPosScalingFactor_x and ILPosScalingFactor_y can be derived from ILScalingFactor_x and ILScalingFactor_y, respectively, if ILScalingFactor_x and ILScalingFactor_y already exist. For example, if ILScalingFactor_x and ILScalingFactor_y already exist, ILPosScalingFactor_x and ILPosScalingFactor_y can be derived according to an embodiment of the present invention as follows:

$$ILPosScalingFactor\_x = ((1<<M2)/ILScalingFactor\_x + (1<<(N2-1))) >> N2, \text{ and} \tag{31}$$

$$ILPosScalingFactor\_y = ((1<<M2)/ILScalingFactor\_y + (1<<(N2-1))) >> N2, \tag{32}$$

where M2 and N2 can be any integer value. While the same parameter, M2 is used for both ILPosScalingFactor_x and ILPosScalingFactor_y derivation, different parameters may also be used. Similarly, the same parameter, N2 is used for both ILPosScalingFactor_x and ILPosScalingFactor_y derivation, different parameters may also be used.

On the other hand, the ILScalingFactor_x can be derived from ILPosScalingFactor_x, and ILScalingFactor_y can be derived from ILPosScalingFactor_y, when ILPosScalingFactor_x and ILPosScalingFactor_y already exist. For example, if ILPosScalingFactor_x and ILPosScalingFactor_y already exist, ILScalingFactor_x and ILScalingFactor_y can be derived according to an embodiment of the present invention as follows:

$$ILScalingFactor\_x = ((1<<M3)/ILPosScalingFactor\_x + (1<<(N3-1))) >> N3, \text{ and} \tag{33}$$

$$ILScalingFactor\_y = ((1<<M3)/ILPosScalingFactor\_y + (1<<(N3-1))) >> N3, \tag{34}$$

where M3 and N3 can be any integer value.

In the derivation of inter-layer position mapping scaling factors and the reference pixel position in BL derivation, the factors, N3 and M3 can be dependent on the information of picture size of the EL, picture size of the BL, cropped picture size of the EL, cropped picture size of the BL, level index/information of the EL, level index/information of the BL.

Alternatively, the ILScalingFactor_x and ILScalingFactor_y can be derived as follows:

$$Factor\_X = (2^{I3} + |wBL/2|)/wBL, \text{ and} \tag{35}$$

$$ILScalingFactor\_x = \text{clip}(K3, L3, (wEL \times Factor\_X + (1<<(J3-1))) >> J3), \tag{36}$$

where the wBL=(picBL_W−picBLCropLeftOffset−picBLCropRightOffset), wEL=(picEL_W−picELCropLeftOffset−picELCropRightOffset). I3, J3, K3 and L3 are integers. For example, I3 can be 14, J3 can be 6, K3 can be −4096 or 0, and L3 can be 4095.

$$Factor\_Y = (2^{I3} + |hBL/2|)/hBL, \text{ and} \tag{37}$$

$$ILScalingFactor\_Y = \text{clip}(K3, L3, (hEL \times Factor\_Y + (1<<(J3-1))) >> J3), \tag{38}$$

where the hBL=(picBL_H−picBLCropTopOffset−picBLCropBottomOffset), hEL=(picEL_H−picELCropTopOffset−picELCropBottomOffset). While ILScalingFactor_Y derivation uses the same parameters, I3, J3, K3 and L3 as ILScalingFactor_X derivation, different parameters may also be used.

Inter-layer pixel position mapping can be derived in a more general form as follows:

$$xBL = (((xEL + factor\_EL\_x) \times ILPosScalingFactor\_x + add5\_x) >> N4) + factor\_BL\_x, \text{ and} \tag{39}$$

$$yBL = (((yEL + factor\_EL\_y) \times ILPosScalingFactor\_y + add5\_y) >> N4) + factor\_BL\_y, \tag{40}$$

where add5_x and add5_y can be 0, (2^(N4−1)) or (2^(N4−1))−1. factor_EL_x can be derived from the information of picELCropLeftOffset, picELCropRightOffset, horizontal phase shift of EL, color format of EL, or color component of EL. Factor_BL_x can be derived from the information of picBLCropLeftOffset, picBLCropRightOffset, horizontal phase shift of BL, color format of BL, or color component of BL. Factor_EL_y can be derived from the information of picELCropTopOffset, picELCropBottomOffset, vertical phase shift of EL, color format of EL, or color component of EL. Factor_BL_y can be derived from the information of picBLCropTopOffset, picBLCropBottomOffset, vertical phase shift of BL, color format of BL, or color component of BL. While the same parameter, N4 is used for xBL and yBL derivation, different parameters may also be used.

For texture up-sampling process, the base layer pixel position is derived in the units of 1/M5 pixel. The ILPosScalingFactor_x and ILPosScalingFactor_y can be replaced as ILPosScalingFactor_x*M5 and ILPosScalingFactor_y*M5 for deriving the collocated BL pixel position. The factor_BL_x, factor_BL_y, factor_EL_x, factor_EL_y can be changed accordingly with the value of M4. For example, $$xBL\_M5=(((xEL+factor\_EL\_x) \times ILPosScalingFactor\_x*M5+add6\_x)>>N5)+factor\_BL\_x, \text{ and} \quad (41)$$

$$yBL\_M5=(((yEL+factor\_EL\_y) \times ILPosScalingFactor\_y*M5+add6\_y)>>N5)+factor\_BL\_y, \quad (42)$$

where add6_x, add6_y, M5 and N5 are integers. While the same parameter, M5 is used for xBL and yBL derivation, different parameters may also be used. Similarly, the same parameter, N5 is used for xBL and yBL derivation, different parameters may also be used.

In another example, the texture up-sampled pixel position takes into consideration of the phase shift between samples in the EL and BL. The derivation is shown as follows:

$$xBL\_M6=((xEL \times ILPosScalingFactor\_x*M6+add7\_x)>>N6)-BL\_phase\_offset\_x \quad (43)$$

The variable yBL_M6 is derived as follows:
If cIdx is equal to 0, the variable yBL_M6 is derived as follows:

$$yBL\_M6=((yEL \times ILPosScalingFactor\_y*M6+add7\_y)>>N6)-BL\_phase\_offset\_y \quad (44)$$

Otherwise, the variable yBL_M6 is derived as follows:

$$yBL\_M6=((yEL \times ILPosScalingFactor\_y*M6)>>N6)-\text{offset}-BL\_phase\_offset\_y \quad (45)$$

where the cIdx is the color component index, add7_x, add7_y, M6 and N6 are integers, the BL_phase_offset_x and BL_phase_offset_y are phase shifts and can be 0. When BL_phase_offset_x and BL_phase_offset_y are 0 and M6 is 16, the value of offset is derived in the same way as SHM-1.0.

In yet another example, the base layer pixel position is derived in the unit of 1/M5 pixel (e.g. for the texture up-sampling) as follows:

$$ILPosScalingFactorM5\_x=(((picBL\_W-picBLCropLeftOffset-picBLCropRightOffset)<<N5)*M5+\text{offset}\_x)/(picEL\_W-picELCropLeftOffset-picELCropRightOffset), \quad (46)$$

where offset_x can be 0, ((picEL_W−picELCropLeftOffset−picELCropRightOffset)>>1) or ((picEL_W−picELCropLeftOffset−picELCropRightOffset)>>1)−1

$$ILPosScalingFactorM5\_y=(((picBL\_H-picBLCropTopOffset-picBLCropBottomOffset)<<N5)*M5+\text{offset}\_y)/(picEL\_H-picELCropTopOffset-picELCropBottomOffset), \quad (47)$$

where offset_y can be 0, ((picEL_H−picELCropTopOffset−picELCropBottomOffset)>>1) or ((picEL_H−picELCropTopOffset−picELCropBottomOffset)>>1)−1.

The reference pixel position (xBL_M5, yBL_M5) in the BL in the unit of 1/M5 pixel is derived as follows:

$$xBL\_M5=((xEL \times ILPosScalingFactor\_x+add6\_x)>>N5)-BL\_phase\_offset\_x \quad (48)$$

For pixel position yBL_M5 in the BL, it is derived as follows:
If cIdx is equal to 0, $$yBL\_M5=((yEL \times ILPosScalingFactor\_y+add6\_y)>>N5)-BL\_phase\_offset\_y; \quad (49)$$

Otherwise, $$yBL\_M5=((yEL \times ILPosScalingFactor\_y)>>N5)-\text{offset}-BL\_phase\_offset\_y; \quad (50)$$

where the cIdx is the color component index, the BL_phase_offset_y and BL_phase_offset_x can be 0. When BL_phase_offset_x and BL_phase_offset_y are 0 and M6 is 16, the value of offset is derived in the same way as SHM-1.0.

In yet another example, the base layer pixel position is derived in the unit of 1/M5 pixel (e.g. for the texture up-sampling) as follows:

$$ILPosScalingFactorM\_x=(((picBL\_W-picBLCropLeftOffset-picBLCropRightOffset)<<N5)+\text{offset}\_x)/(picEL\_W-picELCropLeftOffset-picELCropRightOffset), \quad (51)$$

where offset_x can be 0, ((picEL_W−picELCropLeftOffset−picELCropRightOffset)>>1) or ((picEL_W−picELCropLeftOffset−picELCropRightOffset)>>1)−1.

$$ILPosScalingFactorM\_y=(((picBL\_H-picBLCropTopOffset-picBLCropBottomOffset)<<N5)+\text{offset}\_y)/(picEL\_H-picELCropTopOffset-picELCropBottomOffset), \quad (52)$$

where offset_y can be 0, ((picEL_H−picELCropTopOffset−picELCropBottomOffset)>>1) or ((picEL_H−picELCropTopOffset−picELCropBottomOffset)>>1)−1.

The reference pixel position (xBL_M5, yBL_M5) in the BL in the unit of 1/M5 pixel is derived as follows:

$$xBL\_M5=((xEL \times ILPosScalingFactor\_x+add6\_x)>>(N5-\text{Ceil}(\text{Log }2(M5))))-BL\_phase\_offset\_x \quad (53)$$

For pixel position yBL_M5 in the BL, it is derived as follows:
If cIdx is equal to 0, $$yBL\_M5=((yEL \times ILPosScalingFactor\_y+add6\_y)>>(N5-\text{Ceil}(\text{Log }2(M5))))-BL\_phase\_offset\_y; \quad (54)$$

Otherwise, $$yBL\_M5=((yEL \times ILPosScalingFactor\_y)>>(N5-\text{Ceil}(\text{Log }2(M5))))-\text{offset}-BL\_phase\_offset\_y \quad (55)$$

where the cIdx is the color component index, add6_x and add6_y can be 0 or (2^(N5−1−Ceil(Log 2(M5)))) or (2^(N5−1−Ceil(Log 2(M5))))−1, BL_phase_offset_y and BL_phase_offset_x can be 0. While the same parameters, M5 and N5 are used for xBL_M5 and yBL_M5 derivation, different parameters may also be used. When BL_phase_offset_y and BL_phase_offset_x are 0, and M5 and N5 are 16, the value of offset is derived in the same way as SHM-1.0.

In the derivation of inter-layer position mapping scaling factors and the reference pixel position in BL derivation, the factor N (i.e., N4-N6 in equations (39)-(55)) can be dependent on the information of picture size of EL, picture size of BL, cropped picture size of EL, cropped picture size of BL, level index/information of EL, or level index/information of BL.

Motion Field Mapping

Figure 2:
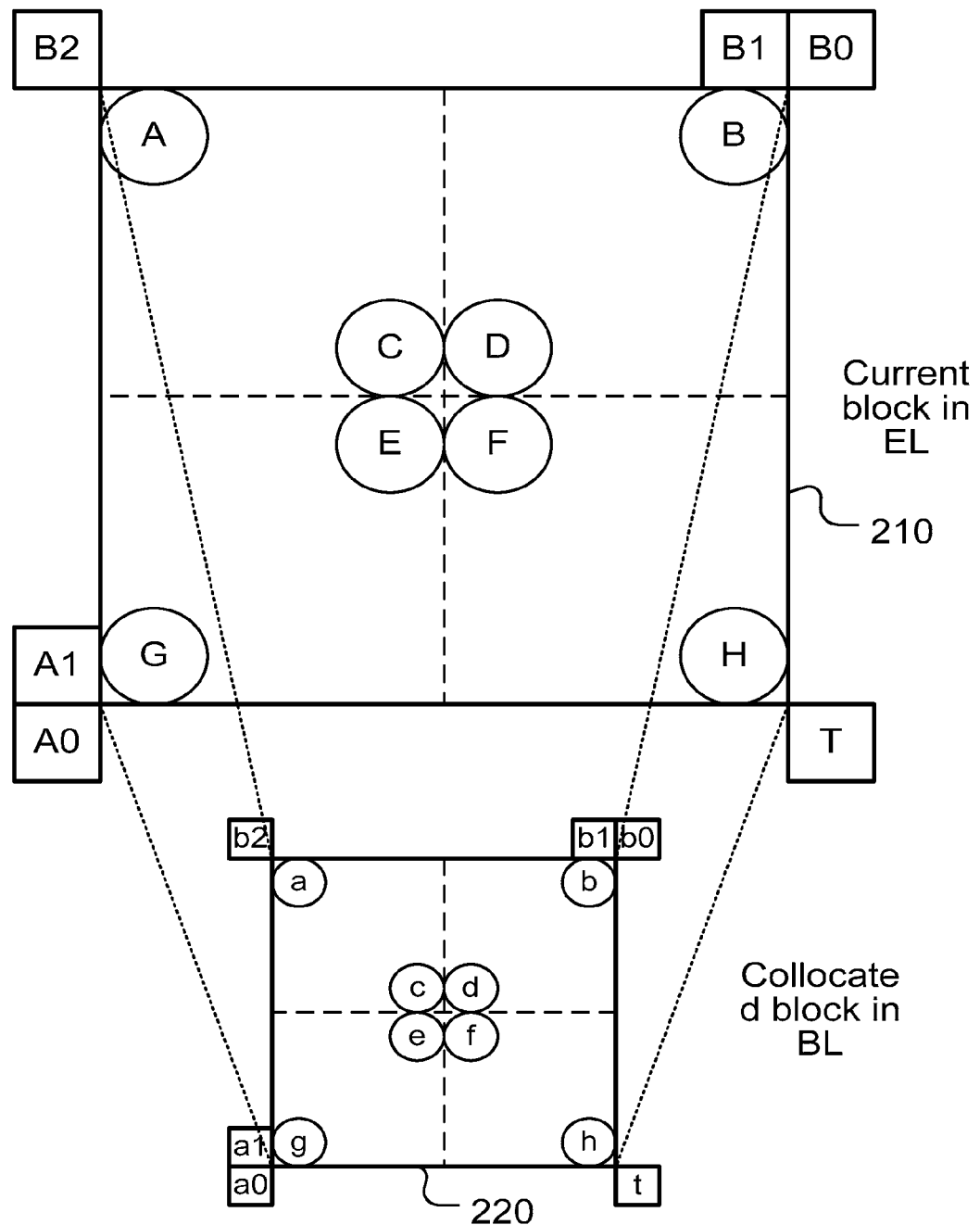
FIG. 2 illustrates an example of deriving multiple candidates for an enhancement-layer block based on motion information of a corresponding base-layer block and neighboring blocks of the base-layer block.
Figure 3:
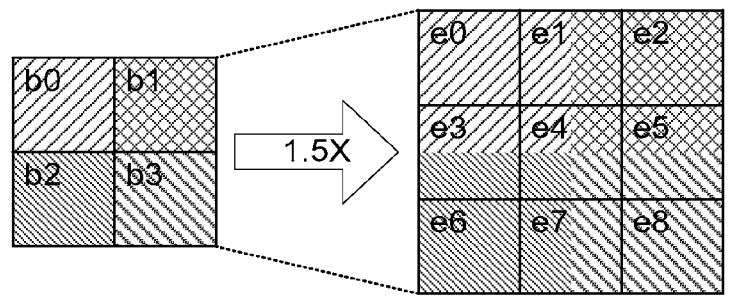
FIG. 3 illustrates an example of motion field mapping corresponding to 1.5× spatial scalability.
Figure 4:
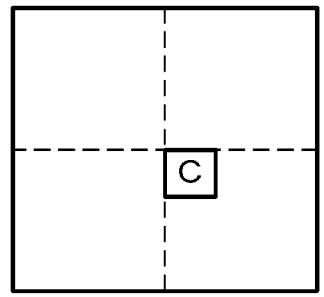
FIG. 4 illustrates an example where the center motion vector (as indicated by C) of a 16×16 block is used to represent the motion vector of the 16×16 block after compression.

In HEVC temporal MVP (TMVP) derivation, the MV corresponding to position T of the PU (prediction unit) is used as shown in FIG. 2. In other words, the MVs in the bottom-right direction are more important in TMVP derivation.

Since the mapped motion field in SHVC is used for TMVP derivation, in one embodiment of the present invention, the MV of the bottom-right PU is used for motion field mapping. For the inter-layer reference picture, the bottom-right motion vector of a 16×16 block (the MV that belongs to the bottom-right pixel of a 16×16 block) is used to represent the motion vector of this 16×16 block after motion mapping.

BL Pixel Position Rounding

Figure 5:
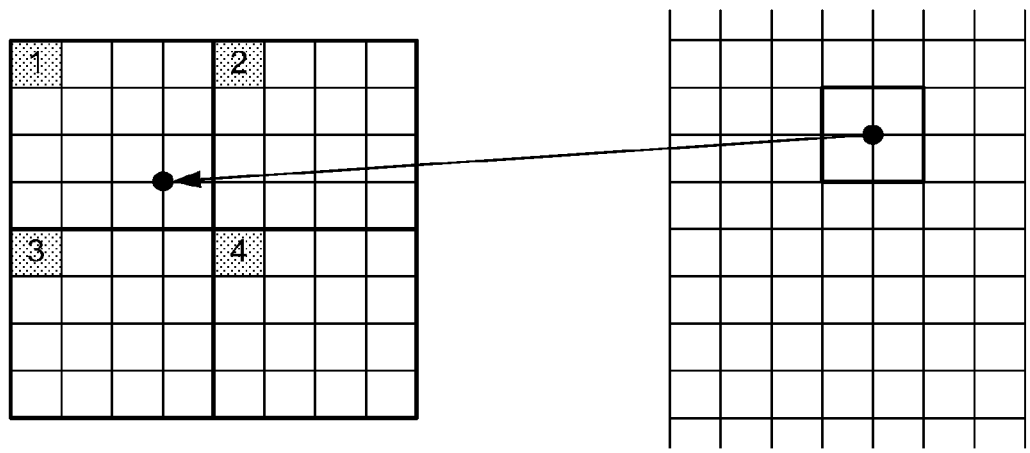
FIG. 5 illustrates an example of deriving inter-layer collocated motion vector for an enhancement layer picture from a base layer picture.

In SHVC motion field mapping, the collocated BL MV of the center point of a 16×16 block is used to represent the motion vector of the 16×16 block. In order to be compatible with HEVC, the BL motion field is compressed with the unit of 16×16 block. The upper-left MV of a 16×16 block is used to represent the motion vector of this 16×16 block. Since in the BL motion field is compressed, the derived BL MV may not be the best MV. FIG. 5 illustrates an example of the scenario that the derived BL MV may not be the best MV, where the MV of point P is mapped to the MV of block 1. However, since the MV of block 4 is closer to the MV of point P, block 4 should provide a better MV for point P.

Therefore, another embodiment of the present invention rounds the BL pixel position mapping to get the closest MV. For a certain point in EL (xEL, yEL), the collocated pixel position in BL (xBL, yBL) can be derived by inter-layer pixel position mapping. For the inter-layer collocated MV derivation, a rounding offset is added to the (xBL, yBL) to obtain the closest compressed BL MV. Accordingly, (N/2−1) offset is added for (xBL, yBL) if the motion field is compressed with the unit of N×N.

In SHVC, the N equals to 16. Therefore, a (7, 7) offset is added to the (xBL, yBL) for inter-layer collocated MV derivation.

Differential Inter-Layer Reference Picture

In SHVC refIdx mode, an up-sampled BL picture of current frame is inserted into the reference frame list. To improve the coding efficiency, another embodiment of the present invention inserts another differential inter-layer reference picture (DIRP) into the reference picture list. This DIRP is generated by adding the up-sampled BL picture of the current frame (frame C) with one of the EL reference frame (frame B), and subtracting by the up-sampled BL picture of the one of the EL reference frame (frame D). The pixel value of a point (x,y) in DIRP can be shown as the following equation.

$$DIRP(x,y)=\text{clip}(\text{pixel\_min\_value}, \text{pixel\_max\_value}, (B(x,y)+C(x,y)-D(x,y))) \qquad (56)$$

where DIRP(x,y) is the pixel value at point (x,y) in DIRP, B(x,y) is the pixel value of point (x,y) in one of the EL reference frame, C(x,y) is the pixel value at point (x,y) of the up-sampled BL picture of current frame, D(x,y) is the pixel value at point (x,y) of the up-sampled BL picture of the one of the EL reference frame. This DIRP can be inserted as the last of the reference frame list.

Figure 6:
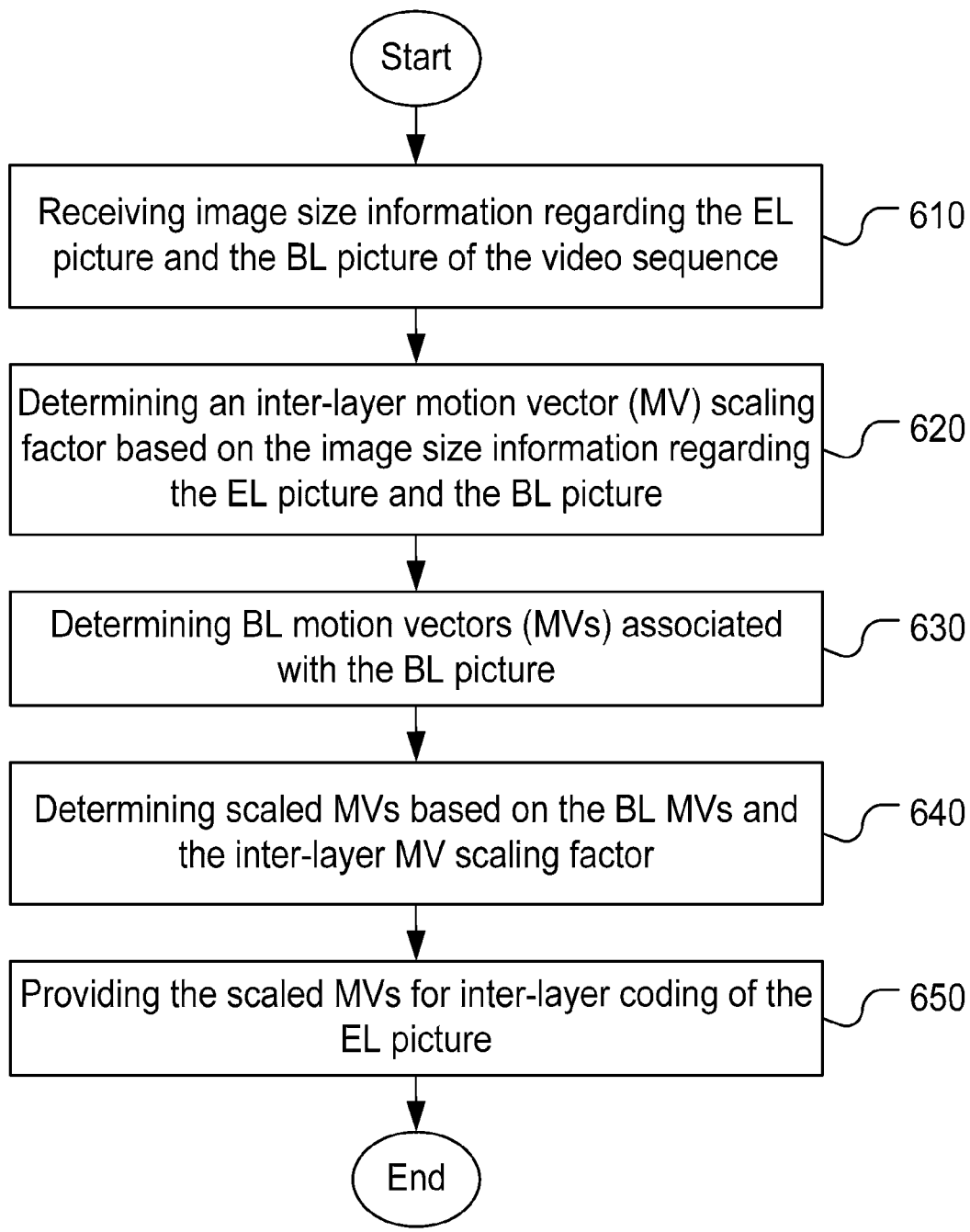
FIG. 6 illustrates an exemplary flowchart of a scalable video coding system incorporating an inter-layer motion vector (MV) scaling factor in scaled MV derivation.

FIG. 6 illustrates an exemplary flowchart of a scalable video coding system incorporating an inter-layer motion vector (MV) scaling factor according to an embodiment of the present invention. The video data is configured into a Base Layer (BL) and an Enhancement Layer (EL), where the EL video data has higher spatial resolution than the BL video data. The system receives image size information regarding the EL picture and the BL picture of the video sequence as shown in step 610. For encoding, the image size information may be determined by the encoder. For decoding, the image size information may be determined from the coded bitstream. An inter-layer motion vector (MV) scaling factor is determined based on the image size information regarding the EL picture and the BL picture as shown in step 620. BL motion vectors (MVs) associated with the BL picture are then determined as shown in step 630. In the encoder side, the BL MVs may be determined using motion estimation and the derived BL MVs may be incorporated in the bitstream. At the decoder side, the BL MVs may be determined from the coded bitstream. Scaled MVs are determined based on the BL MVs and the inter-layer MV scaling factor and the scaled MVs are provided for inter-layer coding of the EL picture as shown in steps 640 and 650.

Figure 7:
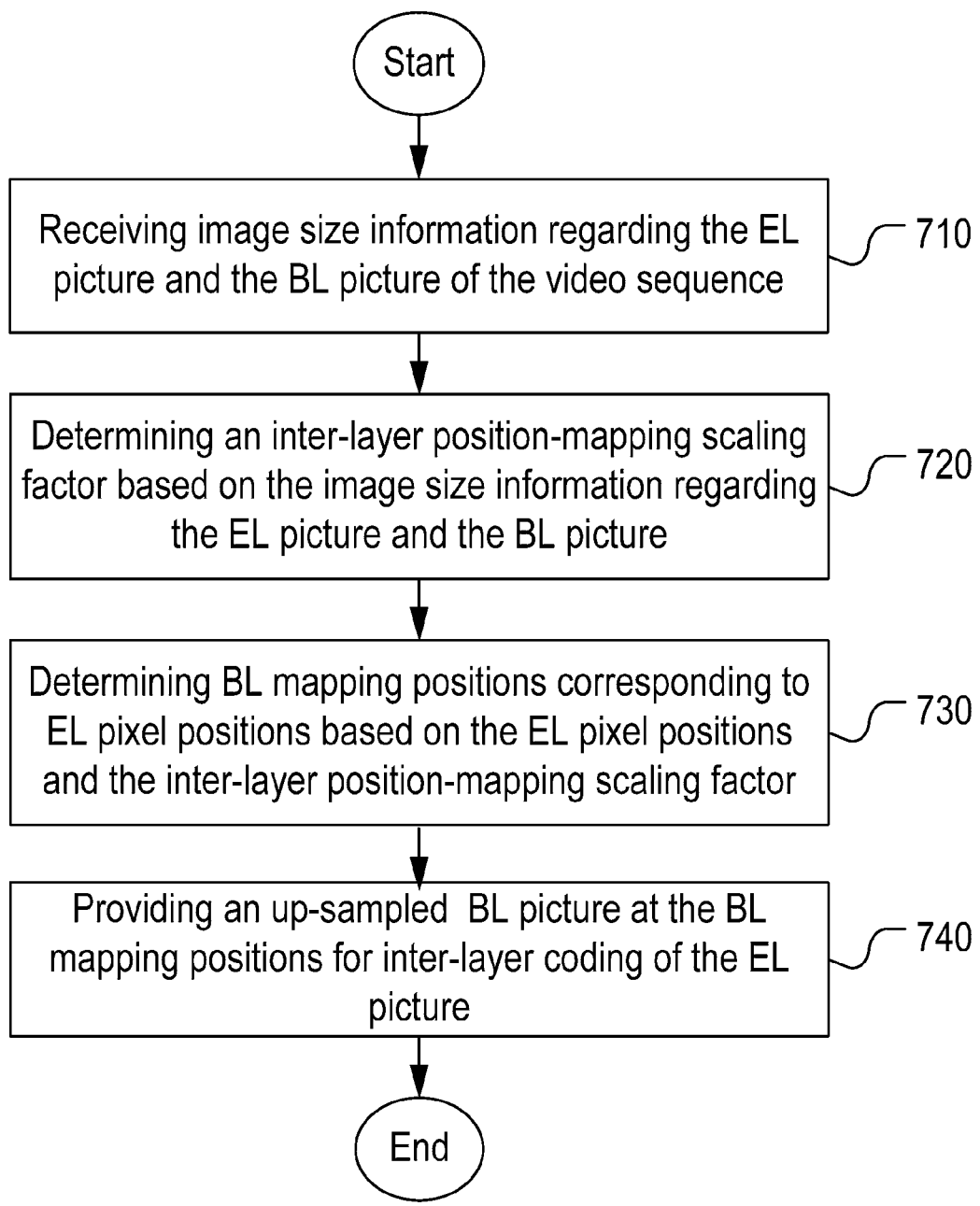
FIG. 7 illustrates an exemplary flowchart of a scalable video coding system incorporating an inter-layer position mapping scaling factor in BL pixel position mapping.

FIG. 7 illustrates an exemplary flowchart of a scalable video coding system incorporating an inter-layer position-mapping scaling factor according to an embodiment of the present invention. The system receives image size information regarding the EL picture and the BL picture of the video sequence as shown in step 710. The inter-layer position-mapping scaling factor is determined based on the image size information regarding the EL picture and the BL picture as shown in step 720. BL mapping positions corresponding to EL pixel positions are determined based on the EL pixel positions and the inter-layer position-mapping scaling factor as shown in step 730. The up-sampled BL picture at the BL mapping positions is then provided for inter-layer coding of the EL picture as shown in step 740.

The flowcharts shown above are intended to illustrate examples of scalable video coding. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of inter-layer prediction for scalable video coding, wherein video sequence data is configured into a Base Layer (BL) and an Enhancement Layer (EL) and wherein an EL picture in the EL has higher spatial resolution than a BL picture in the BL, the method comprising:
receiving image size information regarding the EL picture and the BL picture of the video sequence;
determining an inter-layer motion vector (MV) scaling factor based on the image size information regarding the EL picture and the BL picture;
determining BL motion vectors (MVs) associated with the BL picture;
determining scaled MVs based on the BL MVs and the inter-layer MV scaling factor; and
providing the scaled MVs for inter-layer coding of the EL picture,
wherein the inter-layer MV scaling factor is determined from a ratio of biased-pre-scaled cropped EL picture resolution to the cropped BL picture resolution, wherein the biased-pre-scaled cropped EL picture resolution is obtained by adding a bias value to pre-scaled cropped EL picture resolution, and wherein the pre-scaled cropped EL picture resolution is derived by applying arithmetic left shift by K bits to the cropped EL picture resolution and K is a non-negative integer.

2. The method of claim 1, wherein the inter-layer MV scaling factor is related to cropped EL picture resolution of the EL picture and cropped BL picture resolution of the BL picture.

3. The method of claim 1, wherein the ratio is further clipped to a range having a floor value and a ceiling value.

4. The method of claim 1, wherein individual inter-layer MV scaling factors are determined for horizontal direction and vertical direction.

5. The method of claim 4, wherein the individual inter-layer MV scaling factors for the horizontal direction and the vertical direction are signaled in a sequence level, a picture level or a slice level.

6. The method of claim 4, wherein the individual inter-layer MV scaling factors for the horizontal direction and the vertical direction are signaled in sequence parameter set (SPS), picture parameter set (PPS), slice header, SPS extension, PPS extension, or slice segment header extension.

7. The method of claim 4, wherein a flag is used to indicate whether the individual inter-layer MV scaling factors are equal or not.

8. The method of claim 1, wherein the inter-layer MV scaling factor is determined once for an EL image unit and all blocks in the EL image unit share the inter-layer MV scaling factor, wherein the image unit corresponds to one video sequence, one picture, one slice, one coding tree unit (CTU), one coding tree block (CTB), one coding unit (CU) or one prediction unit (PU).

9. The method of claim 1, further comprising determining an inter-layer position-mapping scaling factor based on the inter-layer MV scaling factor, wherein the inter-layer position-mapping scaling factor is used to determine BL mapping positions corresponding to EL pixel positions, and wherein the BL mapping positions are determined based on the EL pixel positions and the inter-layer position-mapping scaling factor.

10. A method of inter-layer prediction for scalable video coding, wherein video sequence data is configured into a Base Layer (BL) and an Enhancement Layer (EL) and wherein an EL picture in the EL has higher spatial resolution than a BL picture in the BL, the method comprising:
receiving image size information regarding the EL picture and the BL picture of the video sequence;
determining an inter-layer position-mapping scaling factor based on the image size information regarding the EL picture and the BL picture;
determining BL mapping positions corresponding to EL pixel positions based on the EL pixel positions and the inter-layer position-mapping scaling factor; and
providing an up-sampled BL picture at the BL mapping positions for inter-layer coding of the EL picture,
wherein the inter-layer position-mapping scaling factor is determined from a ratio of biased-pre-scaled cropped BL picture resolution to the cropped EL picture resolution, wherein the biased-pre-scaled cropped BL picture resolution is obtained by adding a bias value to pre-scaled cropped BL picture resolution, and wherein the pre-scaled cropped BL picture resolution is derived by applying arithmetic left shift by N bits to the cropped BL picture resolution and N is a non-negative integer.

11. The method of claim 10, wherein the inter-layer position-mapping scaling factor is related to cropped BL picture resolution of the BL picture and cropped EL picture resolution of the EL picture.

12. The method of claim 10, wherein the EL pixel positions are clipped to a range related to EL picture size or cropped EL picture size of the EL picture before said determining the BL mapping positions corresponding to the EL pixel positions.

13. The method of claim 10, wherein the BL mapping pixel positions are clipped to a range related to BL picture size or cropped BL picture size of the BL picture after said determining the BL mapping positions corresponding to EL pixel positions.

14. The method of claim 10, wherein individual inter-layer position-mapping scaling factors are determined for horizontal direction and vertical direction.

15. The method of claim 14, wherein the individual inter-layer position-mapping scaling factors for the horizontal direction and the vertical direction are signaled in a sequence level, a picture level or a slice level.

16. The method of claim 14, wherein the individual inter-layer position-mapping scaling factors for the horizontal direction and the vertical direction are signaled in sequence parameter set (SPS), picture parameter set (PPS), slice header, SPS extension, PPS extension, or slice segment header extension.

17. The method of claim 14, wherein a flag is used to indicate whether the individual inter-layer position-mapping scaling factors are equal or not.

18. The method of claim 10, wherein the inter-layer position-mapping scaling factor is determined once for an EL image unit and all blocks in the EL image unit share the inter-layer position-mapping scaling factor, wherein the image unit corresponds to one video sequence, one picture, one slice, one coding tree unit (CTU), one coding tree block (CTB), one coding unit (CU) or one prediction unit (PU).

19. The method of claim 10, further comprising determining an inter-layer motion vector (MV) scaling factor based on the inter-layer position-mapping scaling factor, wherein the inter-layer MV scaling factor is used to determine scaled MVs based on the BL MVs and the inter-layer MV scaling factor.

20. A method of inter-layer prediction for scalable video coding, wherein video sequence data is configured into a Base Layer (BL) and an Enhancement Layer (EL) and wherein an EL picture in the EL has higher spatial resolution than a BL picture in the BL, the method comprising:
 receiving image size information regarding the EL picture and the BL picture of the video sequence;
 determining an inter-layer position-mapping scaling factor based on the image size information regarding the EL picture and the BL picture;
 determining BL mapping positions corresponding to EL pixel positions based on the EL pixel positions and the inter-layer position-mapping scaling factor; and
 providing an up-sampled BL picture at the BL mapping positions for inter-layer coding of the EL picture, wherein the BL mapping position for a given EL pixel position is determined by adding a first offset term to a first product, wherein the first offset term corresponds to BL picture first edge, the first product is obtained by multiplying the inter-layer position-mapping scaling factor by a first distance from the given EL pixel position to EL picture first edge.

21. The method of claim 20, wherein the first product is further processed by adding a bias value to obtain a biased first product and applying arithmetic right shift by N bits to the biased first product, and N is a non-negative integer.

22. The method of claim 20, wherein the BL mapping position for the given EL pixel position is determined by adding a second offset term to the first offset term and the first product, wherein the second offset term corresponds to a phase shift related to up-sampling and down-sampling applied to the EL picture and the BL picture.

* * * * *